United States Patent [19]

Fukuoka

[11] Patent Number: 5,059,963
[45] Date of Patent: Oct. 22, 1991

[54] TWO-LEVEL DISPLAY DEVICE WITH HATCHING CONTROL MEANS

[75] Inventor: Hirofumi Fukuoka, Osaka, Japan

[73] Assignee: Sharp Kabushiki Kaisha, Osaka, Japan

[21] Appl. No.: 239,435

[22] Filed: Sep. 1, 1988

[30] Foreign Application Priority Data

Jan. 12, 1988 [JP]  Japan .................................. 63-5549
Jan. 13, 1988 [JP]  Japan .................................. 63-5278

[51] Int. Cl.$^5$ .......................... G09G 3/00; G09G 3/36
[52] U.S. Cl. .................................... 340/793; 340/703; 340/784
[58] Field of Search ............... 340/783, 793, 701, 702, 340/703, 784, 767; 358/459

[56] References Cited

U.S. PATENT DOCUMENTS

| | | | |
|---|---|---|---|
| 4,688,031 | 8/1987 | Haggerty | 340/793 |
| 4,791,417 | 12/1988 | Bobak | 340/793 |
| 4,808,991 | 2/1989 | Tachiuchi et al. | 340/793 |
| 4,827,255 | 5/1989 | Ishii | 340/703 |
| 4,833,464 | 5/1989 | Di Santo et al. | 340/793 |

Primary Examiner—Ulysses Weldon
Assistant Examiner—M. Fatahiyar
Attorney, Agent, or Firm—Irell & Manella

[57] ABSTRACT

A display device of a type for displaying in two levels is so controlled as to display images of different colors by hatching according to different patterns such that images of different colors can be distinguished. In order to prevent distortion of image caused by hatching, hatching corresponding to any particular color can be selectively prevented. With a binary conversion circuit with adjustable reference voltages, an image with various combinations of analog color signals can also be displayed.

3 Claims, 6 Drawing Sheets

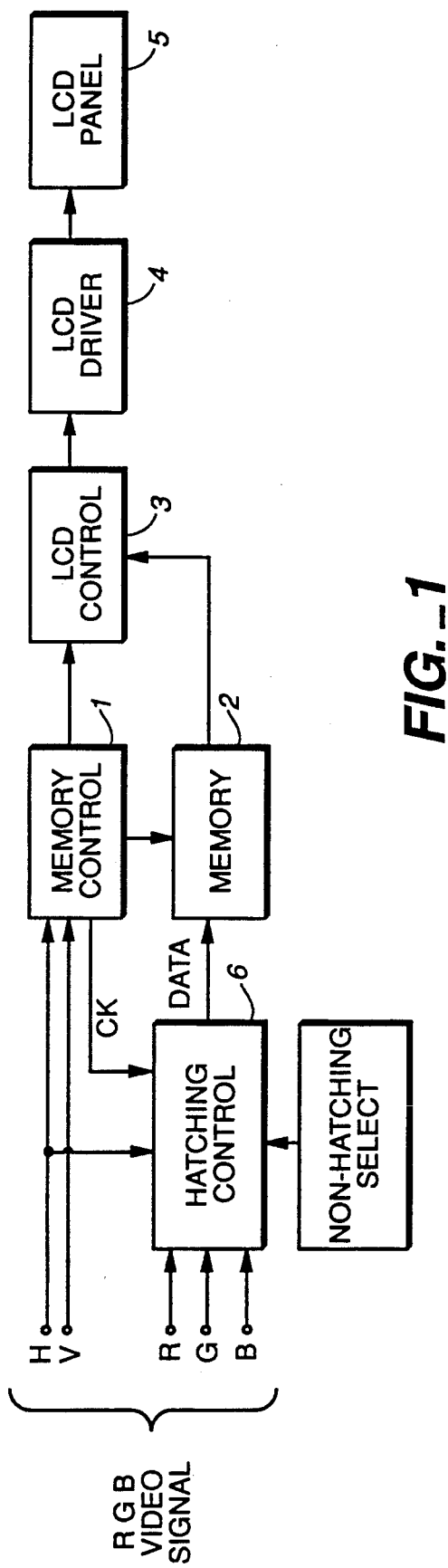
FIG._1
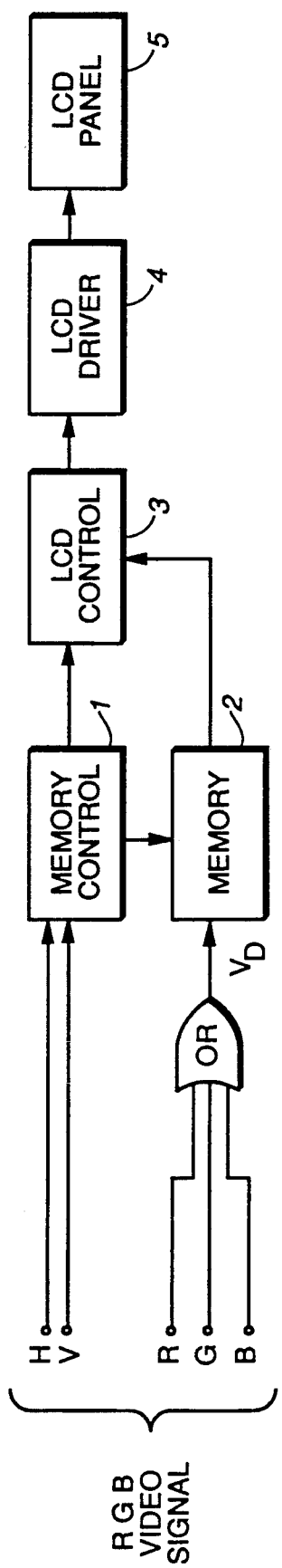
FIG._10 (PRIOR ART)

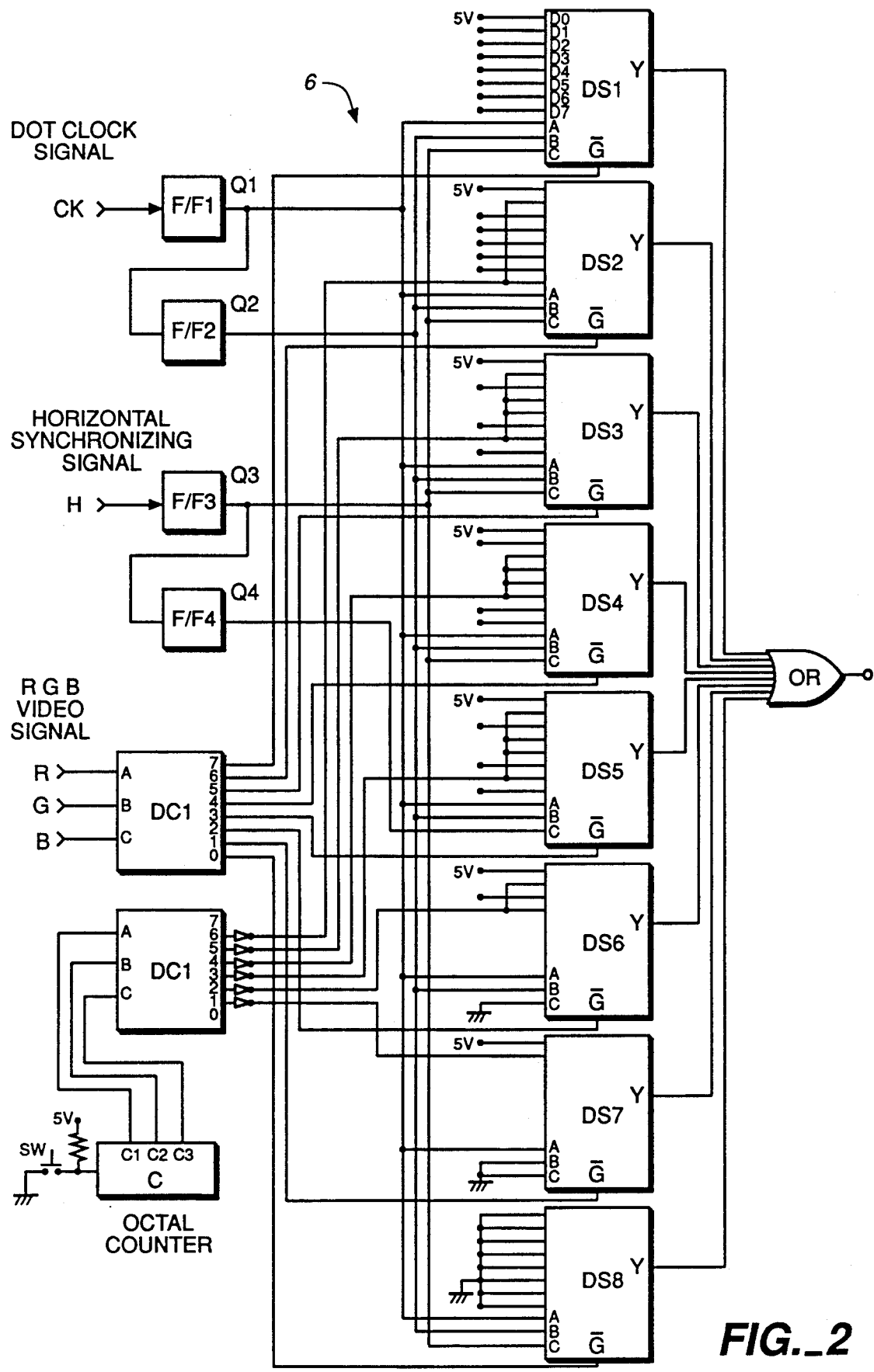
FIG._2

FIG._3A 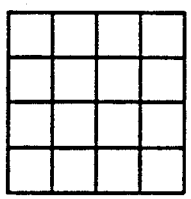 R = H, G = H, B = H } WHITE
FIG._3B 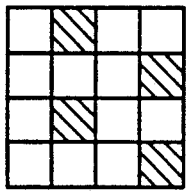 R = L, G = H, B = H } CYANIC
FIG._3C 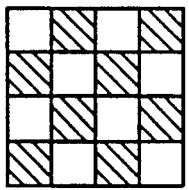 R = H, G = L, B = H } MAGENTA
FIG._3D 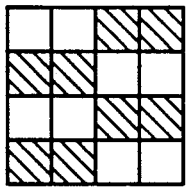 R = L, G = L, B = H } BLUE
FIG._3E 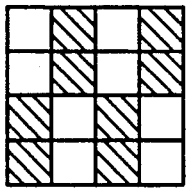 R = H, G = H, B = L } BROWN
FIG._3F 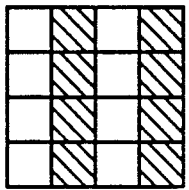 R = L, G = H, B = L } GREEN
FIG._3G 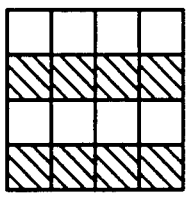 R = H, G = L, B = L } RED
FIG._3H 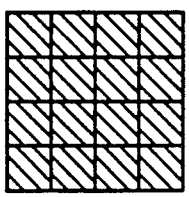 R = L, G = L, B = L } BLACK

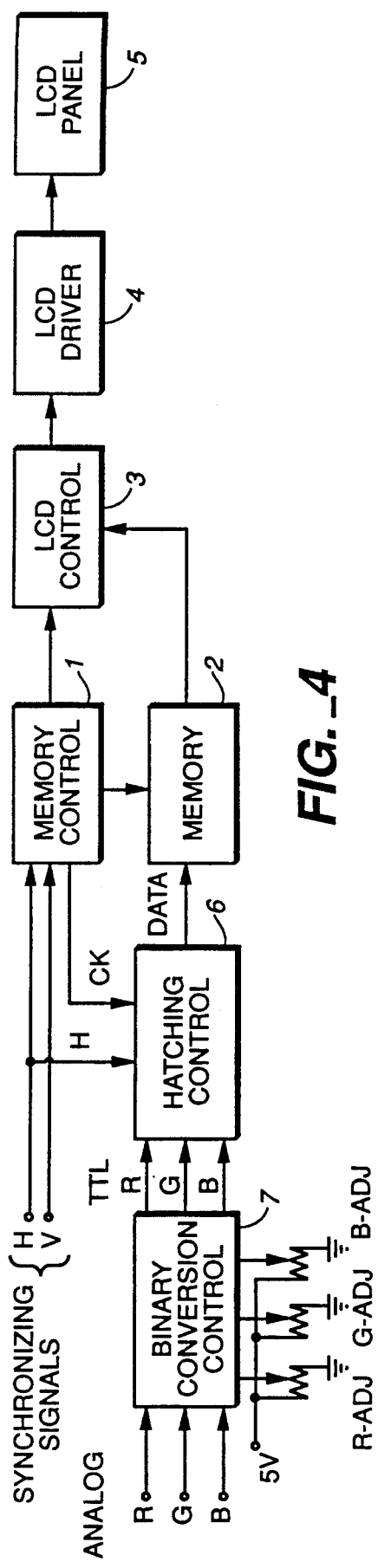
FIG._4
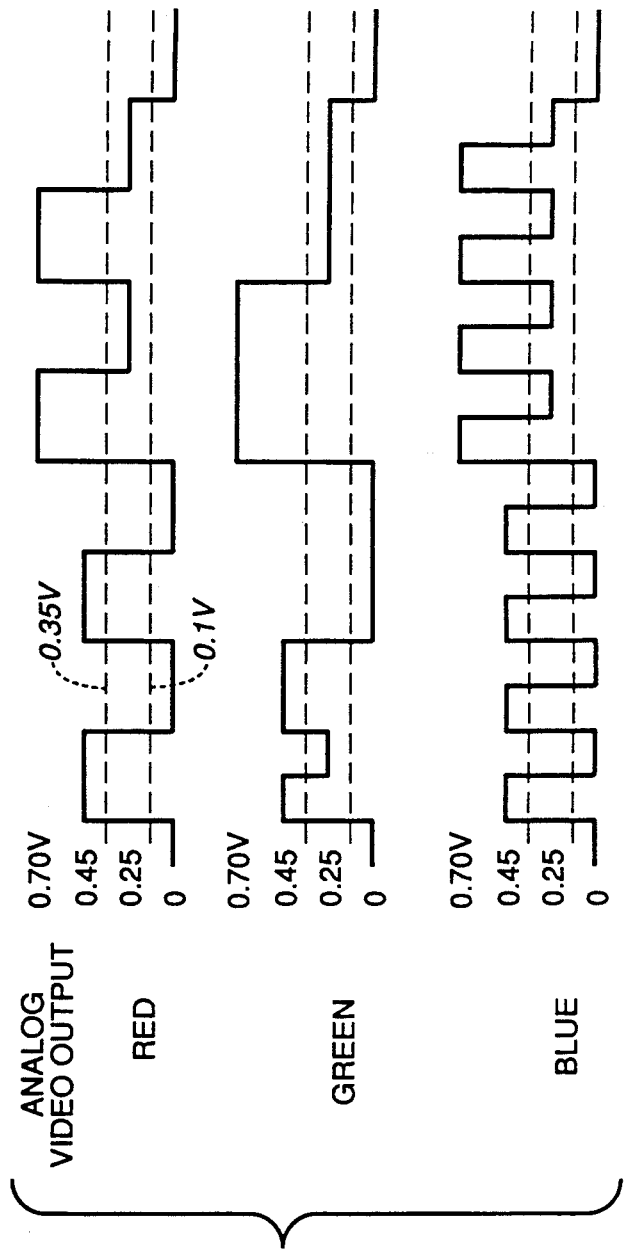
FIG._6

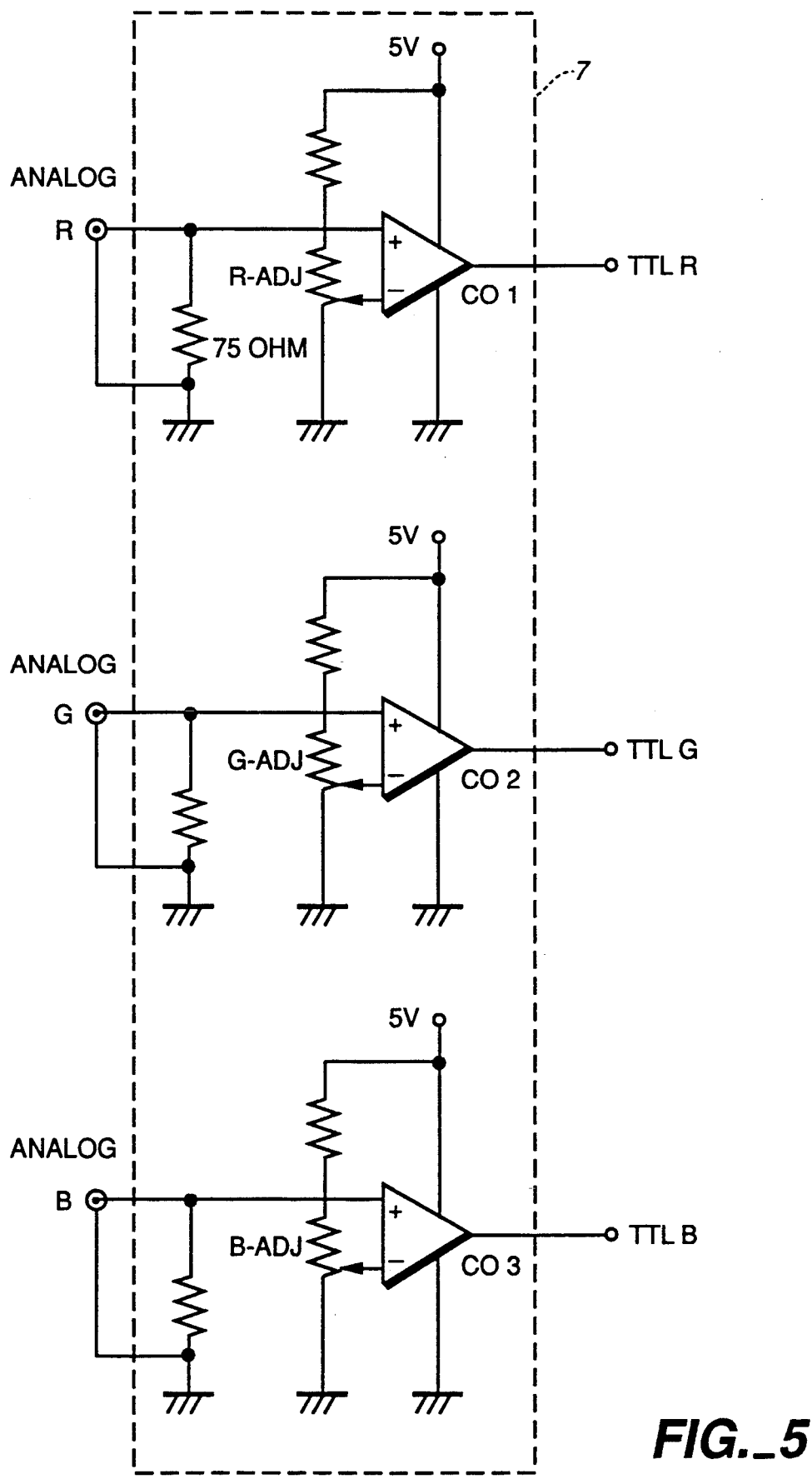
FIG._5

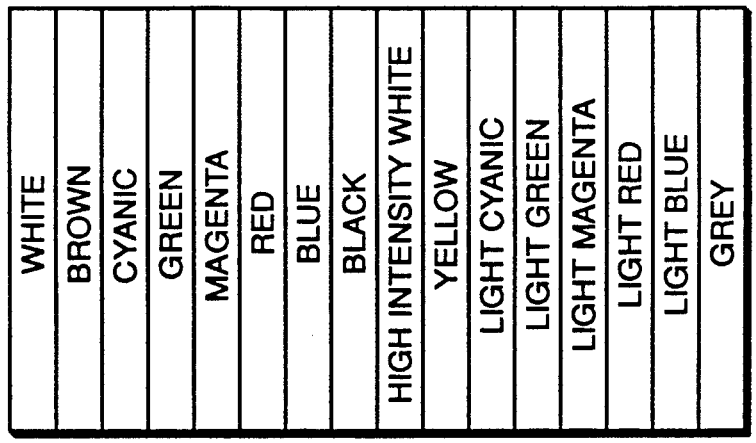
FIG._7
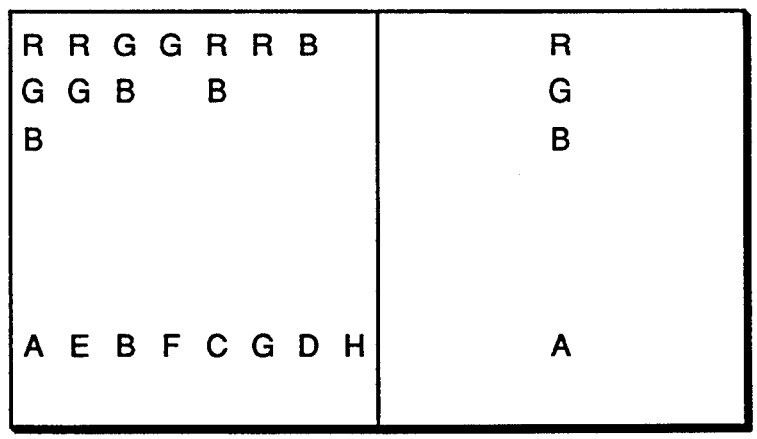
FIG._8
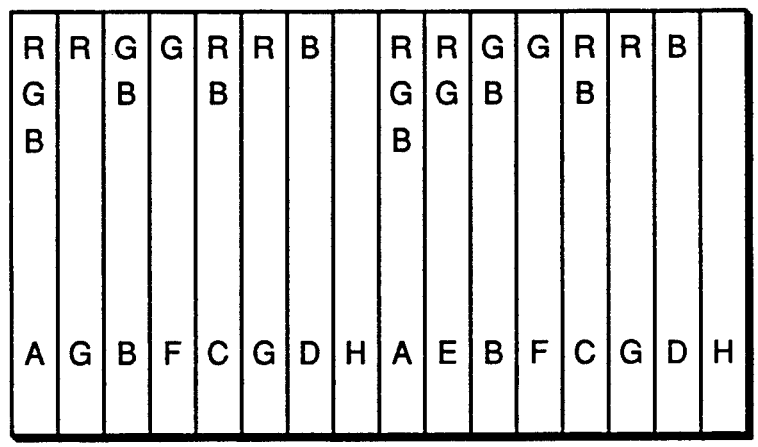
FIG._9

TWO-LEVEL DISPLAY DEVICE WITH HATCHING CONTROL MEANS

BACKGROUND OF THE INVENTION

This invention relates to a two-level (binary) display device such as a liquid crystal, electroluminescense or plasma display device which makes a display oh two levels H (High) and L (Low), and more particularly to such a display device provided with a control circuit for displaying video color signals.

Since liquid crystal, electroluminescense and plasma display devices are all similar in that they all make a display in two levels, a liquid crystal display device is used to explain the background of the present invention. With reference to FIG. 10 which is a prior art control circuit for a liquid crystal display which receives binary-converted TTL-level signals such as separate red (R), green (G) and blue (B) video signals from a video output port of a personal computer, for example, an OR gate takes a logical sum from an RGB signal to produce a video signal $V_D$ and this video signal $V_D$ is extracted under control of a memory control circuit 1 only during display periods according to the timing of horizontal and vertical synchronizing signals H and V and received by a memory device 2. Data received by the memory device 2 are retrieved by a liquid crystal display control circuit 3 and supplied through a liquid crystal driver circuit 4 to a liquid crystal display panel 5 at a timing necessary for the liquid crystal display. In a circuit thus structured, the memory device 2 and the memory control circuit 1 are used for matching the high-speed video data with the low-speed liquid crystal display and the memory control circuit 1 serves to generate many kinds of input and output timing signals for this purpose.

When an RGB color signal is received by a prior art display device, however, colors cannot be distinguished because the display device is for making a display only in two levels and also because a logical sum is taken from the RGB signal to generate the video signal to be inputted into the memory device 2. Suppose, for example, that an input signal for red, blue and green stripes has been received on a cathode ray tube screen of a personal computer. If it is attempted to display it on a liquid crystal display panel, however, the entire surface makes an ON display and the viewer cannot tell whether it is a display of an all white input signal.

SUMMARY OF THE INVENTION

It is therefore an object of the present invention to provide a device for displaying in two levels with which a distinctive display can be made from an input color signal.

A two-level display device according to the present invention is characterized as having means for receiving separate RGB video signals and generating hatching patterns corresponding to the individual color signals and also means for selectively inhibiting the generation of such hatching patterns. In other words, hatching patterns are generated by hatching control means corresponding to individual colors such that each color can be displayed differently. Hatching patterns are generated by removing dots according to a predetermined program and different hatching patterns are obtained corresponding to different colors by removing dots from different positions such that different colors can be distinguished because they are represented by different dot patterns.

In short, this method is based on removing dots forcibly according to a pattern corresponding to a color which it is desired to display. Although this does not present a problem when the image to be displayed includes a large number of dots, a difficulty arises in the case of a small figure for which even one dot can be very important because the display may become unclear or distorted if dots are removed for showing the color of the image. This is why the display device of the present invention is also provided with hatching inhibiting means. When a pattern is small or otherwise such that dots should not be removed even for showing its color because such a removal would make the image unclear or distorted, the hatching inhibiting means prevents removal of dots from specified patterns.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a block diagram of a control circuit embodying the present invention for a two-level display device such as a liquid crystal display panel, FIG. 2 is a detailed circuit diagram of a hatching control circuit, FIGS. 3A-3H are drawings of hatching patterns, FIG. 4 is a block diagram of another control circuit embodying the present invention adapted to receive analog color video signals, FIG. 5 is a detailed circuit diagram of the binary conversion control circuit of FIG. 4, FIG. 6 is a time chart of exemplary analog RGB separate video signals, FIG. 7 is an example of display on an analog cathode ray tube monitor, FIG. 8 is an example of liquid crystal display from the signal of FIG. 6 when adjustment is not well done, FIG. 9 is another example of liquid crystal display from the signal of FIG. 6 when adjustment is well done, and FIG. 10 is a block diagram of a prior art control circuit for a liquid crystal display panel.

Throughout these figures, components that are identical or equivalent are indicated by same numerals.

DESCRIPTION OF A PREFERRED EMBODIMENT

With reference to FIG. 1 which is a block diagram of a control circuit embodying the present invention, separate RGB video signals are received first by a hatching control circuit 6 which generates hatching pattern signals from the received video signals. At the same time, a memory control circuit 1 generates a timing signal (dot clock signal CK) for sampling data for one screen display based on horizontal and vertical synchronizing signals H and V. The hatching pattern signals thus generated are recorded into a memory 2 according to this timing signal. The data thus recorded into the memory 2 are retrieved by a liquid crystal display control circuit 3 according to a timing required for a liquid crystal display and displayed through a liquid crystal driver circuit 4 on a liquid crystal display panel 5.

With reference next to FIG. 2 which shows the hatching control circuit 6 in detail, the dot clock signal CK generated by the memory control circuit 1 is received by a first flip-flop FF1 and its output $Q_1$ is received not only by eight data selectors DS1–DS8 through their select A terminals but also by a second flip-flop FF2. The output $Q_2$ from the second flip-flop FF2 is received by the data selectors DS1–DS6 and DS8 through their select B terminals.

The horizontal synchronizing signal H is received by a third flip-flop FF3 and the output therefrom is received by the data selectors DS1–DS4 and DS8 through their select C terminals as well as by a fourth flip-flop FF4. The output from the fourth flip-flop FF4 is received by the data selector DS5 through its select C terminal. Table 1 summarizes the input-output relationship described above.

RGB video signals are received by a first decoder DC1 through its input terminals A, B and C. The output levels through its eight output terminals 0–7 are determined as shown in Table 2, depending on the input levels at the input terminals A, B and C. Output signals from the output terminals 7–0 of this decoder DC1 are respectively received by the data selectors DS1–DS8 through their strobe terminals $\overline{G}$ to switch on and off their selector functions.

Data input terminals $D_0$–$D_7$ of the data selectors DS1–DS8 receive data for generating a hatching pattern to be selectively outputted through their output terminals Y, depending on the input through their select terminals A, B and C. A logical sum of these output signals through the output terminals Y is obtained by an OR gate (OR) and is transmitted to the memory 2. The relationship between the output Y from each data selector and the signals received thereby through its select terminals A, B and C is shown in FIG. 3. If the signals received by the select terminals A, B and C are respectively Low, Low and High, for example, FIG. 3 shows that the signal received through the data input terminal $D_1$ is transmitted as the output signal therefrom to the OR gate.

What is herein referred to as a non-hatching select circuit is comprised of a switch SW, an octal counter C with three output terminals $C_1$, $C_2$ and $C_3$, and a second decoder DC2 with three input terminals A, B and C respectively connected to the output terminals $C_1$, $C_2$ and $C_3$ of the octal counter and eight output terminals 0–7 such that data to be received by the input terminals $D_0$–$D_4$ of the data selectors DS1–DS8 can be appropriately varied, depending on the output from the second decoder DC2. The output levels through the eight output terminals of the second decoder DC2 and the input signals through its three input terminals are also related as shown in Table 2. Of the eight output terminals of the second decoder DC2, the terminals 1–6 are each provided with an invertor as shown in FIG. 2. Thus, when the counter value is zero (that is, $C_1=C_2=C_3=0$ or the input signals through the input terminals A, B and C are all low, Table 2 shows that the output signal from the terminal 0 of the second decoder DC2 is Low but those from the other output terminals 1–7 are all High. Since the output terminals 1–6 are provided with an invertor, however, High signals are transmitted to the data selectors DS2–DS7.

When a white signal represented by RGB video signals with R=High, G=High and B=High is received, the output signal from Terminal 7 of the first decoder DC1 is Low as shown in Table 2. This means that the first data selector DS1, which receives a Low signal through its $\overline{G}$ terminal is switched on. Since all eight input terminals $D_0$–$D_7$ of the first data selector DS1 are receiving a High signal as shown in FIG. 2, it is always a High signal that is outputted from the first data selector DS1, independently of the levels of its select terminals A, B and C. In other words, a High signal is outputted whenever a white signal is received, independently of the dot clock signal CK or the horizontal synchronizing signal H. This corresponds to the pattern for white shown in FIG. 3A.

If a brown signal is received, corresponding to R=High, G=High and B=Low, the third output terminal 3 of the first decoder DC1 becomes Low as shown in Table 2 and the fifth data selector DS5 is selected. As shown in Table 1 (and also in FIG. 2), the fifth data selector DS5 is so connected that its select A, B and C input terminals receive outputs $Q_1$, $Q_2$ and $Q_4$ of the first, second and fourth flip-flops FF1, FF2 and FF4. Since the output $Q_1$ from the first flip-flop FF1 is a signal which becomes High and Low at each clock pulse, the output $Q_2$ from the second flip-flop FF2 is a signal which becomes High and Low at every other clock pulse and the output $Q_3$ is a signal which becomes high and Low at every other horizontal synchronizing signal, the signal transmitted accordingly from the output terminal Y reverses High and Low at each clock pulse and every other horizontal line. This corresponds to the pattern shown in FIG. 3E. Table 4 shows in detail the input signals through Terminals A, B and C and the output signals through the Terminal Y at each clock pulse. In Table 4, H=High means a white display and L=Low means a black display. Asterisks indicate levels determined by the octal counter C and the second decoder DC2.

If a signal representing another color is received by a different RGB video signal, another one of the data selectors DS1–DS8 is similarly selected and a corresponding hatching pattern as shown in FIGS. 3A–3H is outputted according to the signals received through its select A, B and C terminals. Thus, according to the embodiment of the present invention described above, images in eight different colors can be distinguished on the liquid crystal display panel 5. In the case of a bar graph, for example, a very clear display can be obtained by using different hatching patterns for different colors.

In the case of a very small image, however, hatching may have an adverse effect because hatching according to the present invention means removing dots selectively where they normally should be. The aforementioned non-hatching select control circuit is provided in order to prevent such adverse effects by controllably stopping the hatching operation.

The octal counter C with three output terminals $C_1$, $C_2$ and $C_3$ serves to count up every time the switch SW is pressed. When the octal counter C is counting 3 by outputting $C_1$=High, $C_2$=High and $C_3$=Low (because $2^0+2^1=3$), for example, the output signal from the second decoder DC2 is all High except for the Low signal from the third output terminal 3 as shown in Table 2. Because the output terminals of the second decoder DC2 (except for Terminals 0 and 7) are provided with invertors, High signals are received by the fifth data selector DS5 through all its input terminals $D_0$–$D_7$. As a result, this data selector behaves like the first data selector DS1 and the corresponding hatching pattern becomes as shown in FIG. 3A for white independently of what signals are received by its select A, B and C terminals. In other words, no dots are removed for hatching. In summary, the user can push the switch SW to select any color for which hatching is not desired. If the octal counter is counting 0 or 7, however, a color display is made according to the hatching patterns of FIGS. 3A-3H.

In summary, the present invention makes it possible to distinguish RGB color signals even on a display device of the type adapted to make a display in only two levels such as High and Low. Although this is done by removing dots according to patterns each representing a color, means for inhibiting hatching are provided such that the user can selectively prevent the hatching in situations where hatching would distort the displayed image.

The foregoing description of a preferred embodiment of the invention has been presented for purposes of illustration and description. It is not intended to be exhaustive or to limit the invention to the precise form disclosed, and modifications and variations are possible in light of the above teaching. For example, there may be provided a 7-segment light emitting diode or the like to be operated by the output signals from the octal counter C for indicating hatching for which color is to be prevented. Furthermore, the control circuit described in detail above by way of FIG. 1 can be modified as shown in FIG. 4 such that a hatched display of the type described above can be effected by receiving analog RGB separate video signals. Recently, there has been a great progress in the display capabilities of personal computers and high-precision, multi-color display is now possible on a cathode ray tube. For example, video output signal may be a digital-to-analog converted (analog) signal and 64 gray levels may be displayed at 0-0.7 VPP. If a display device for displaying in two levels is provided only with input terminals of TTL levels, however, displays of the type described above cannot be made by receiving such analog video signals.

In FIG. 4, numeral 7 indicates a binary conversion control circuit which is adapted to receive analog RGB separate video signals and to convert them into binary (two-level) signals at optimum levels matching the input levels, thereby producing digital (TTL-level) RGB signals to be received by the aforementioned hatching control circuit 6. Although video signal levels received by this binary conversion control circuit 7 change in various ways by the software used by the personal computer, the user of the device shown in FIG. 7 can produce a desired display on the liquid crystal display panel 5 by adjusting reference levels for the binary conversion to be described more fully below while watching the screen of the cathode ray tube monitor of the personal computer.

FIG. 5 shows an example of such a binary conversion control circuit. With reference to FIG. 5, analog RGB signals of the type considered above are received respectively through the positive input terminal of the comparators CO1, CO2 and CO3 and are compared with a reference voltage at the negative input terminal. The output is High if the input signal is greater than the corresponding reference voltage, and is Low if it is not. These reference voltages are adjustable by means of variable resisters R-ADJ, G-ADJ and B-ADJ, respectively, and it can thus be determined which input level should be considered effective as a signal.

Assume, as an example, that input signals as shown in FIG. 6 are received from a personal computer. In FIG. 6, the vertical axes indicate the signal voltage and the horizontal axes represent time (say, over one horizontal period). Let us further assume that color bars as shown in FIG. 7 are displayed if the signals shown in FIG. 6 are inputted into a color cathode ray tube monitor adapted for analog input. With the binary conversion control circuit 7 of FIG. 4 properly adjusted, a display similar to the one shown in FIG. 7 can be made on a display device adapted only for display in two levels.

With reference to FIG. 6, if the reference level is set to 0.1 V, the right-hand half screen becomes white (displayed by the white pattern shown in FIG. 3A) as shown in FIG. 8 because any signal above 0.1 V is considered High and displayed similarly on the liquid crystal display panel 5. If the reference level is raised to 0.35 V, the display on the liquid crystal display panel 5 becomes as shown in FIG. 9, which is closer to the image displayed on the analog cathode ray tube monitor. Although the optimum levels of reference voltages vary, depending on the software of the personal computer, it is possible to adjust them as illustrated above to produce a display similar to the one on the cathode ray tube monitor. In FIGS. 8 and 9, A-H indicate the patterns shown in FIGS. 3A-3H respectively.

In summary, the present invention is intended to be broadly construed and such modifications and variations that may be apparent to a person skilled in the art are intended to be included within the scope of this invention.

TABLE 1

| Data Selector | Flip-Flop | | | |
| --- | --- | --- | --- | --- |
| | 1 Input CK Output Q1 | 2 Input CK Output Q2 | 3 Input CK Output Q3 | 4 Input CK Output Q4 |
| DS1 | A | B | C | — |
| DS2 | A | B | C | — |
| DS3 | A | B | C | — |
| DS4 | A | B | C | — |
| DS5 | A | B | — | C |
| DS6 | A | B | (C:GND) | — |
| DS7 | A | (B:GND) | (C:GND) | — |
| DS8 | A | B | C | — |

TABLE 2

| Select Input | | | Output | | | | | | | |
| --- | --- | --- | --- | --- | --- | --- | --- | --- | --- | --- |
| C | B | A | Y0 | Y1 | Y2 | Y3 | Y4 | Y5 | Y6 | Y7 |
| L | L | L | L | H | H | H | H | H | H | H |
| L | L | H | H | L | H | H | H | H | H | H |
| L | H | L | H | H | L | H | H | H | H | H |
| L | H | H | H | H | H | L | H | H | H | H |
| H | L | L | H | H | H | H | L | H | H | H |
| H | L | H | H | H | H | H | H | L | H | H |
| H | H | L | H | H | H | H | H | H | L | H |
| H | H | H | H | H | H | L | H | H | H | L |

TABLE 3

| Select Input | | | Output |
| --- | --- | --- | --- |
| L | L | L | $D_0$ |
| L | L | H | $D_1$ |
| L | H | L | $D_2$ |
| L | H | H | $D_3$ |
| H | L | L | $D_4$ |
| H | L | H | $D_5$ |
| H | H | L | $D_6$ |
| H | H | H | $D_7$ |

TABLE 4

| | Timing | C | B | A | Y |
|---|---|---|---|---|---|
| For first and second horizontal periods | 1 | L | L | L | $D_0(H)$ |
| | 2 | L | L | H | $D_1(L)^*$ |
| | 3 | L | H | L | $D_2(H)$ |
| | 4 | L | H | H | $D_3(L)^*$ |
| For third and fourth horizontal periods | 1 | H | L | L | $D_4(L)^*$ |
| | 2 | H | L | H | $D_5(H)$ |
| | 3 | H | H | L | $D_6(L)^*$ |
| | 4 | H | H | H | $D_7(H)$ |

What is claimed is:

1. A display device for displaying an image in two levels, comprising:
    pattern generation means for receiving red, green and blue color video signals and for generating hatching patterns of the two levels, corresponding individually to a plurality of colors represented by said color signals;
    selection means for selecting one of said colors; and
    inhibiting means, coupled to said pattern generation means and to said selection means, for inhibiting generation of said hatching pattern corresponding to the one selected color selected by said selection means and for generating a non-hatching pattern in one level of the two levels for said selected color instead of the inhibited hatching pattern.

2. The display device as claimed in claim 1, wherein said pattern generation means includes decoder means which has input terminals for receiving two-level red, green and blue color signals and is connected to a plurality of data selector means each capable of generating a hatching pattern representing a different color, said decoder means serving to activate a selected one of said data selector means depending upon signals received through said input terminals.

3. The display device as claimed in claim 2, wherein said inhibiting means includes switching means for selecting one of said data selector means to prevent said selected data selector means from generating a hatching pattern.

* * * * *